(12) United States Patent
Taniguchi (10) Patent No.: US 7,826,403 B2
(45) Date of Patent: Nov. 2, 2010

(54) WIRELESS COMMUNICATION CONTROL APPARATUS AND WIRELESS COMMUNICATION METHOD TO REDUCE INTER-CHANNEL INTERFERENCE IN NARROW-BAND COMMUNICATIONS

(75) Inventor: Masaru Taniguchi, Yokohama (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 766 days.

(21) Appl. No.: 11/663,215

(22) PCT Filed: Sep. 16, 2005

(86) PCT No.: PCT/JP2005/017562
§ 371 (c)(1),
(2), (4) Date: Mar. 20, 2007

(87) PCT Pub. No.: WO2006/033427
PCT Pub. Date: Mar. 30, 2006

(65) Prior Publication Data
US 2008/0101309 A1     May 1, 2008

(30) Foreign Application Priority Data
Sep. 21, 2004   (JP) .............................. 2004-273172

(51) Int. Cl.
*G08C 17/00* (2006.01)
*H04W 4/00* (2009.01)
*H03C 3/00* (2006.01)
*H03K 7/06* (2006.01)
*H04L 27/12* (2006.01)
*H04M 1/00* (2006.01)

(52) U.S. Cl. ....................... 370/311; 370/340; 375/303; 455/574

(58) Field of Classification Search ................. 370/311, 370/330, 340, 341, 343, 344, 329; 455/450, 455/561, 574; 375/303
See application file for complete search history.

(56) References Cited

FOREIGN PATENT DOCUMENTS

EP    0 726 662    8/1996

(Continued)

OTHER PUBLICATIONS

International Search Report for PCT/JP2005/017562.

(Continued)

*Primary Examiner*—Dwayne D Bost
*Assistant Examiner*—Larry Sternbane
(74) *Attorney, Agent, or Firm*—Eric J. Robinson; Robinson Intellectual Property Law Office, P.C.

(57) ABSTRACT

When no messages exist which must be notified to a mobile transmitting/receiving apparatus (102), a carrier signal of non-modulation is outputted in an area of control information of transport data having a frame structure. As a specific example, an FSK modulator (16) causes a carrier signal of non-modulation to be outputted by a transmitting circuit (17) from a line control apparatus (101) in correspondence with the area for control information in which non-modulation data is set by a frame data processing unit (15), while causing a modulated wave signal as four-level FSK modulated to be outputted in the areas other than the non-modulation data area. When non-modulation data is set in the area for control information, function channel identification information in the same frame is set as non-modulation identification data, thereby allowing any unstable operation in the mobile transmitting/receiving apparatus (102) on the receiving side to be avoided.

6 Claims, 7 Drawing Sheets

FOREIGN PATENT DOCUMENTS

| | | |
|---|---|---|
| EP | 0 987 835 | 3/2000 |
| JP | 63-228860 | 9/1988 |
| JP | 01-245728 | 9/1989 |
| JP | 02-260929 | 10/1990 |
| JP | 06-164481 | 6/1994 |
| JP | 10-004380 | 1/1998 |
| JP | 11-261644 | 9/1999 |
| JP | 2000-032068 | 1/2000 |
| JP | 2001-197548 | 7/2001 |
| JP | 2003-101476 | 4/2003 |
| JP | 2003-134027 | 5/2003 |
| JP | 2003-158764 | 5/2003 |
| WO | WO 01/33248 | 5/2001 |
| WO | WO 2004/006465 | 1/2004 |

OTHER PUBLICATIONS

International Preliminary Examination Report (Application No. PCT/JP2005/017562) dated May 31, 2007.

Supplementary European Search Report (Application No. 05785634.6) dated Nov. 24, 2009.

Office Action (JP Application No. 2004-273172) dated Apr. 13, 2010.

CENTER FREQUENCY : 100MHz
LATERAL AXIS : 2kHz/div
LONGITUDINAL AXIS : 10dB/div

WIRELESS COMMUNICATION CONTROL APPARATUS AND WIRELESS COMMUNICATION METHOD TO REDUCE INTER-CHANNEL INTERFERENCE IN NARROW-BAND COMMUNICATIONS

TECHNICAL FIELD

The present invention relates to a wireless communication control apparatus and a wireless communication method.

BACKGROUND ART

A narrowed band of a communication path has been used by a wireless appliance from the viewpoint of improving the utilization efficiency of a radio frequency band. For example, some wireless appliances are obliged to provide one communication path per 6.25 kHz from the year of 2005 by part 90 of CFR (Code of Federal Regulation) 47 defined by the U.S. FCC (Federal Communications Commision). Those wireless appliances that cannot meet this condition cannot be granted by type approval on and after the year of 2005 and cannot be sold in the U.S.

Figure 7:
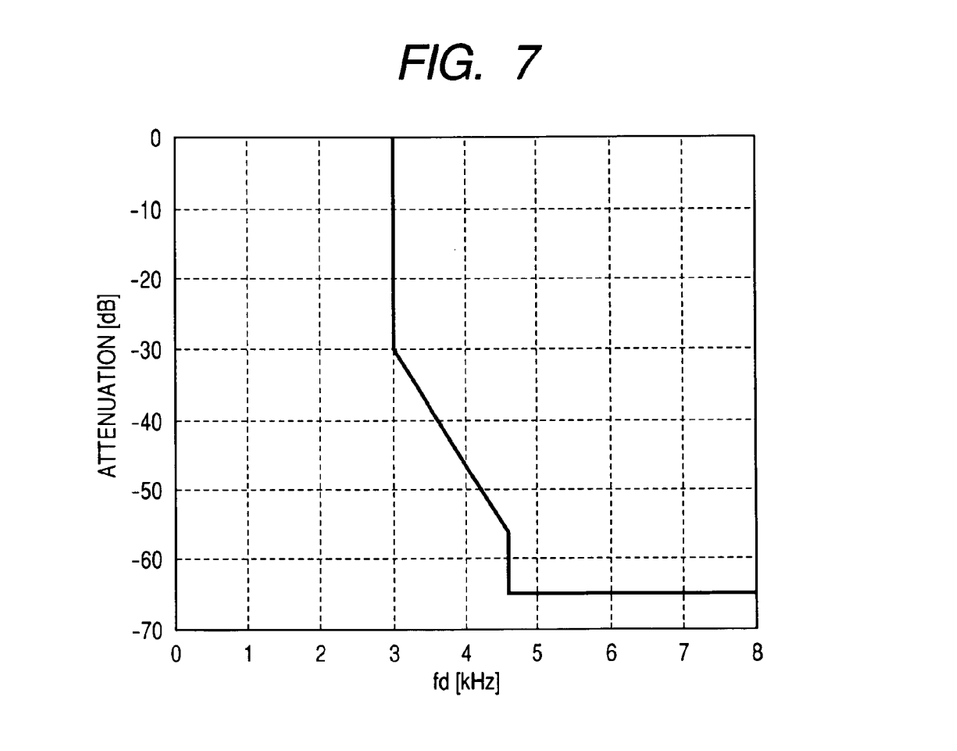
FIG. 7 is a diagram showing a transmission spectrum mask defined in "Mask E"

For the wireless appliance that operates in the bandwidth of 6.25 kHz, a modulation spectrum in the transmitter is required to be in a range of transmission spectrum mask called "Mask E" as shown in FIG. 7. The restrictions by the transmission spectrum defined by the "Mask E" is such that a transmission spectrum in the frequency departing from a carrier (center frequency) by ±3 kHz is less than −30 dB, a transmission power in the frequency departing from a carrier by ±4.6 kHz for a wireless appliance with the transmission output power more than 10 W shall be less than −65 dB, and a transmission spectrum shall be below a line passing −30 dB in ±3 kHz and −55 dB in ±4.5 kHz in the region between ±3 kHz and ±4.6 kHz from a carrier.

Conventionally, the analog FM scheme for transmitting a carrier subjected to direct FM (Frequency Modulation) with an audio signal is adapted in a wireless appliance that operates in the bandwidth of 12.5 kHz or in the bandwidth of 25 kHz. The frequency modulation ratio, however, needs to be significantly small in order to match a transmission spectrum mask defined by "Mask E" as shown in FIG. 7. As such, the conventionally used analog FM scheme significantly degrades the S/N ratio so that a performance sufficient to bear practical use cannot be obtained. Thus, it is considered that a four-level FSK signal, which is resulted from all of audio signals and control signals converted into a digital signal and a carrier being subject to FSK (Frequency Shift Keying) modulation, is transmitted to match the transmission spectrum mask so that sufficient performance is obtained.

As a wireless communication system operated according to the FCC rules and regulations, a system for providing a communication service for various wireless appliances by a trunk scheme in which a plurality of channels such as audio channels and control channels are arranged is known (for example, Japanese Patent No. 2724917).

The wireless communication system in the trunk scheme can improve the efficiency of utilizing a frequency as compared to a wireless communication system or the like, in which each wireless appliance occupies an individual wireless channel, as a plurality of wireless appliances that make mobile wireless stations share a predetermined number of wireless channels. Then the wireless communication system that transmits and receives the four-level FSK signal can also adopt the trunk scheme so that it is expected to improve the efficiency of utilizing a frequency as compared with a conventional system together with rules and regulations according to the above-mentioned FCC.

Figure 8:
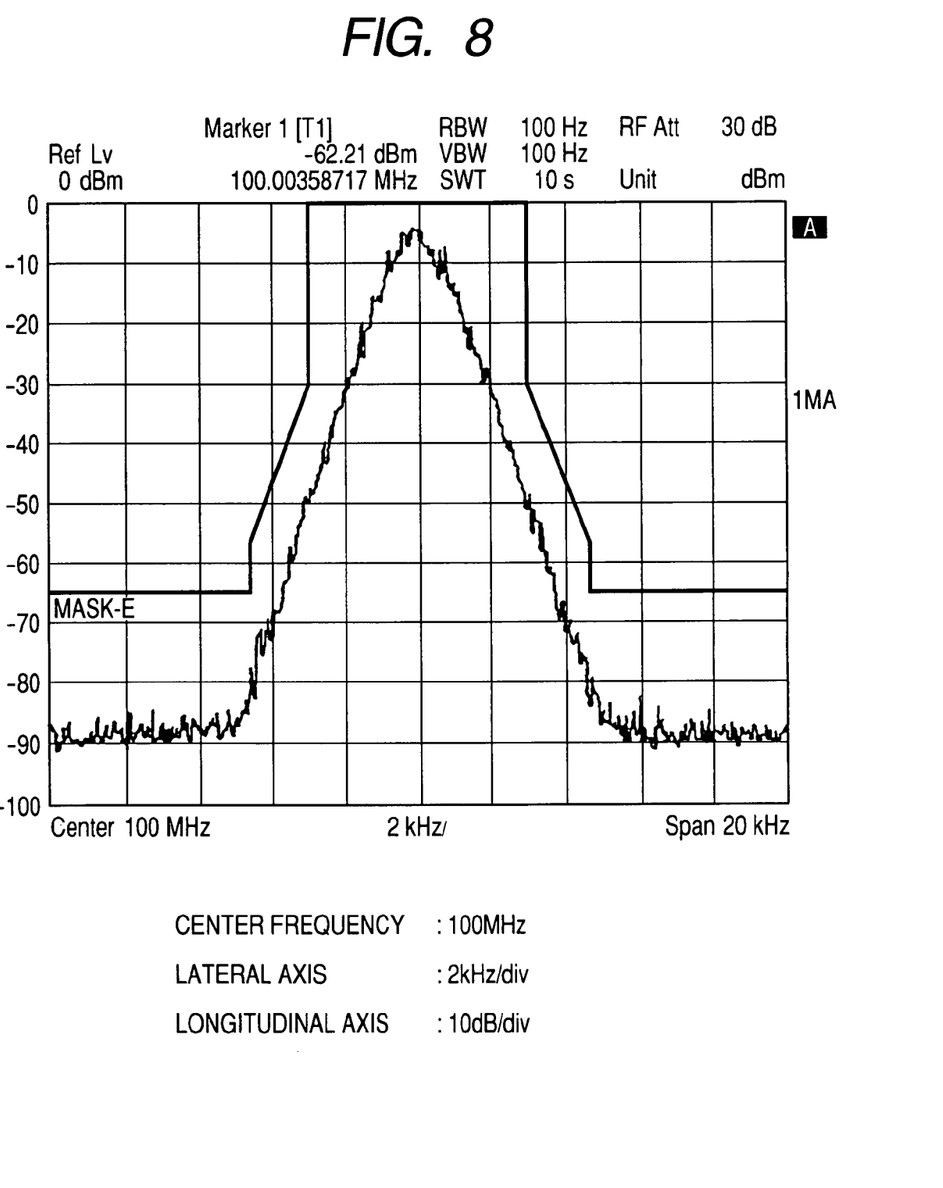
FIG. 8 is a diagram showing an example of spectral distribution in a four-level FSK signal that is matched with a transmission spectrum mask shown in FIG. 7.

FIG. 8 is a diagram showing an example of spectral distribution in a four-level FSK signal that is matched with a transmission spectrum mask of "Mask E". As shown in FIG. 8, the four-level FSK signal can be matched with a transmission spectrum mask of "Mask E" in a predetermined experimental environment. Referring to FIG. 8, the power level in the adjacent channels detuning by 6.25 kHz is a level at the noise floor. From this viewpoint, an electric power leaked to the adjacent channels seems to be sufficiently restrained.

As the FSK modulation, however, has a nonlinear characteristic in contrast to the AM (Amplitude Modulation), it has a feature in which a transmission spectrum is apt to spread as compared with amplitude modulation or the like. If a bandwidth of a filter (BPF; Band Pass Filter) included in the receiver in the actual use environment is ±2 kHz, a spectrum component existent over the range of Δ4.25 kHz to the range of Δ8.25 kHz centering on the transmission frequency (carrier frequency) can give an influence in the form of an electric power leaked to the adjacent channels. Also in FIG. 8, existence of a frequency component in the four-level FSK signal over the range of Δ4.25 kHz centering on the transmission frequency is recognized. That increases, therefore, the level of interference to the adjacent channels in a wireless appliance that operates in the bandwidth of 6.25 kHz, as compared to the level of interference to the adjacent channels in the wireless appliance that operates in the conventional bandwidth of 12.5 kHz.

In the wireless communication system in the trunk scheme, while each of a plurality of wireless channels is set to any of a control channel and a call channel, some signals may be always transmitted from the base station over the control channel in order to control a line. At the side of the wireless appliance that makes a mobile wireless station, place registration or call control is performed as a signal always transmitted from a base station over a control channel is received. Here, the call channel is activated and transmission and reception are performed only when a line control apparatus placed in the base station performs allocation to the mobile wireless station. Thus, no signal is transmitted when the call channel is in the unused idle state. As such, in the radio frequency wave band adjacent to the call channel, the degree of influence from the signal transmitted and received over the call channel is relatively small.

On the contrary, as a signal is always transmitted over the control channel, it is always possible to have interference during a period in which a signal is transmitted over the control channel when the frequency band adjacent to the control channel within the same wireless communication system is used as a call channel or when the frequency band adjacent to the control channel in another wireless communication system is used. As such, a problem occurs in that the degree of interference increases by a signal transmitted and received over the control channel in the radio frequency band adjacent to the control channel.

The present invention is adapted in view of the above-mentioned situations and intends to provide a wireless communication control apparatus and a wireless communication method that can reduce influence to the adjacent channel as matched to the communication path that is made into the narrow-band.

DISCLOSURE OF THE INVENTION

In order to achieve the above-mentioned object, a wireless communication control apparatus according to the first aspect of the present invention is a wireless communication control apparatus for controlling wireless communication using a control channel and a plurality of communication channels that can be allocated to any of a plurality of wireless communication apparatuses that are identified by information transmitted over the control channel, characterized by including:

transport data generating means for generating transport data with a frame structure having at least three areas of a synchronization word, channel identification information and control information; and transmitting means for generating a modulated signal corresponding to transport data generated by said transport data generating means and transmitting the modulated signal to at least one of said plurality of wireless communication apparatuses over a control channel;

wherein said transmitting means can transmit a non-modulated carrier signal in correspondence with an area for control information included in the transport data generated by said transport data generating means.

Said transport data generating means may set non-modulation identification data that identifiably indicates that the area for the control information is non-modulated as function channel identification information included in the area for the channel identification information in the same frame as that of the area for the control information when the area for the control information included in the information with said frame structure is not used to transmit a controlling message, and said transmitting means may transmit a non-modulation carrier signal in correspondence with the area for the control information in the frame in which non-modulation identification data is set by said transport data generating means.

Said transport data generating means may include determining means for determining that the area for the control information is not used for transmitting a controlling message when no messages which must be notified to said wireless communication apparatus is existent.

Said transport data generating means may generate transport data by placing the area for the random access control information indicating either permission or prohibition of transmitting random access as transport data with said frame structure in the place subsequent to the area for the control information; and said transmitting means may resume transmission of a modulated signal in correspondence with the area for the random access control information when a non-modulated carrier signal is transmitted in correspondence with the area for the control information.

A wireless communication control apparatus according to the second aspect of the present invention is a wireless communication control apparatus for controlling wireless communication using a control channel and a plurality of communication channels that can be allocated to any of a plurality of wireless communication apparatuses that are identified by information being transmitted over the control channel, characterized by including:

transport data generating means for generating transport data with a frame structure having at least three areas of a synchronization word, channel identification information and control information; and transmitting means for transmitting a modulated signal subjected to four-level FSK modulation corresponding to the transport data generated by said transport data generating means to at least one of said plurality of wireless communication apparatuses over a control channel;

wherein said transmitting means transmits a modulated signal alternatively subjected to FSK modulation corresponding to two-level symbol with little deviation from the carrier frequency among four-level symbols in correspondence with the area for the control information when the area for the control information included in the transport data generated by said transport data generating means is not used for transmitting the controlling message.

A wireless communication method according to the third aspect of the present invention is a wireless communication method by a wireless communication control apparatus for controlling wireless communication using a control channel and a plurality of call channels that can be allocated to any of a plurality of wireless communication apparatuses that are identified by information transmitted over the control channel, characterized by including:

a transport data generating step of generating transport data with a frame structure having at least three areas of a synchronization word, channel identification information and control information;

a setting step of setting non-modulation identification data that identifiably indicates that the area for the control information is non-modulated as function channel identification information included in the area for the channel identification information in the same frame as that of the area for the control information when the area for the control information included in said transport data is not used to transmit a controlling message; and a transmitting step of generating a modulated signal corresponding to said transport data in the area other than the area for the control information in a frame in which said non-modulation identification data is set and transmitting the non-modulation carrier signal to at least one of said plurality of wireless communication apparatuses over a control channel, while a non-modulation carrier signal is transmitted in correspondence with the area for the control information in which said non-modulation identification data is set.

A wireless communication method according to the fourth aspect of the present invention is a wireless communication method by a wireless communication control apparatus for controlling wireless communication using a control channel and a plurality of call channels that can be allocated to any of a plurality of wireless communication apparatuses that are identified by information transmitted over the control channel, characterized by including:

a transport data generating step of generating transport data with a frame structure having at least three areas of a synchronization word, channel identification information and control information; and a transmitting step of transmitting a modulated signal subjected to four-level FSK modulation corresponding to the transport data generated at said transport data generating step to at least one of said plurality of wireless communication apparatuses over a control channel;

wherein said transmitting step includes a step of transmitting a modulated signal alternatively subjected to FSK modulation corresponding to two-level symbol with little deviation from the carrier frequency among four-level symbols in correspondence with the area for the control information when the area for the control information included in the transport data generated at said transport data generating step is not used for transmitting the controlling message.

BEST MODE FOR CARRYING OUT THE INVENTION

The present invention is applicable to narrowed bands of communication paths and reduces the effect on adjacent channels.

Figure 1:
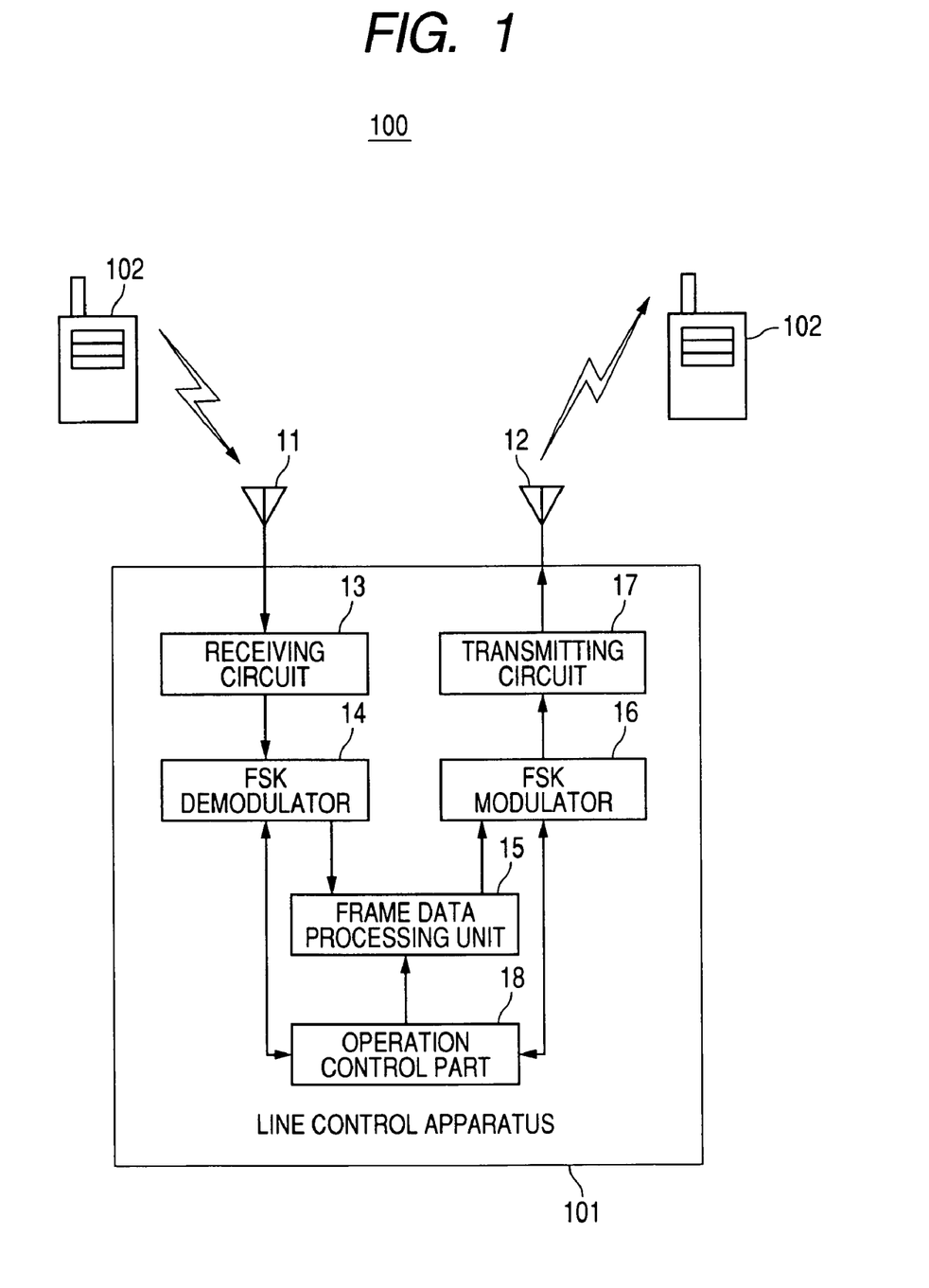
FIG. 1 is a diagram showing an exemplary configuration of a wireless communication system to which a line control apparatus according to an embodiment of the present invention is applied.

A line control apparatus 101 according to an embodiment of the present invention will be described in detail below with reference to drawings. The line control apparatus 101 is applied to a wireless communication system 100 as shown in FIG. 1, for example, for performing wireless communication with a mobile transmitting/receiving apparatus 102 as at least a mobile wireless station (typically, a plurality of mobile wireless stations). In FIG. 1, a line control apparatus 101 and two mobile transmitting/receiving apparatuses 102 are shown as an example. The wireless communication system 100 only needs to be a wireless communication system in a trunk mode that performs wireless communication as a plurality of mobile transmitting/receiving apparatuses 102 transmit and receive a radio frequency (RF) signal with a wireless base station by sharing a predetermined number of wireless channels. Each of the mobile transmitting/receiving apparatuses 102 enables a voice call (conversation) with another communication terminal that is connected with another mobile transmitting/receiving apparatus 102 or another line control apparatus connected with the line control apparatus 101 via a RF link or the line control apparatus 101.

The line control apparatus 101 manages a plurality of wireless channels that are divided into a plurality of frequency bands to be placed therein. The line control apparatus 101 has a function as a wireless communication path control apparatus that performs allocation control on wireless channels for respective mobile transmitting/receiving apparatuses 102. That is to say, the line control apparatus 101 enables a wireless communication service such as the voice call to be provided for respective mobile transmitting/receiving apparatuses 102 by controlling wireless communication using a plurality of communication paths as the plurality of communication paths that can be allocated to any of the mobile transmitting/receiving apparatuses 102 identified by a control channel and information transmitted over the control channel.

The line control apparatus 101 has a receiving antenna 11, a transmitting antenna 12, a receiving circuit 13, a FSK demodulator 14, a frame data processing unit 15, a FSK modulator 16, a transmitting circuit 17, and an operation control part as shown in FIG. 1. The receiving antenna 11 and the transmitting antenna 12 may be configured separately or may be a configuration that can work as either the receiving antenna 11 or the transmitting antenna 12 by switching the same configuration by a switch circuit or the like.

The receiving circuit 13 is configured by a LNA (Low Noise Amplifier) or a down converter, a BPF (Band Pass Filter) or the like, for example, for extracting a frequency component corresponding to each of wireless channels among RF signals received by the receiving antenna 11 and converting the frequency component into a signal for demodulation. The signal outputted from the receiving circuit 13 is sent to the FSK demodulator 14. The FSK demodulator 14 is configured by a frequency discrimination circuit or a frequency voltage conversion circuit, a digital demodulation circuit in a zero-cross mode using an A/D converter or the like, for example, for demodulating received data and supplying it to the frame data processing unit 15 or an operation control part 18 based on a signal outputted from the receiving circuit 13.

The frame data processing unit 15 is configured by a processor that is suitable for digital data processing such as a DSP (Digital Signal Processor) or a MPU (Micro-Processor Unit), for generating transport data with a predetermined frame configuration as data sent over a control channel among a plurality of wireless channels by using data supplied from the receiving circuit 13 or the operation control part 18. The transport data generated by the frame data processing unit 15 is sent to the FSK converter 16.

Figure 2A:
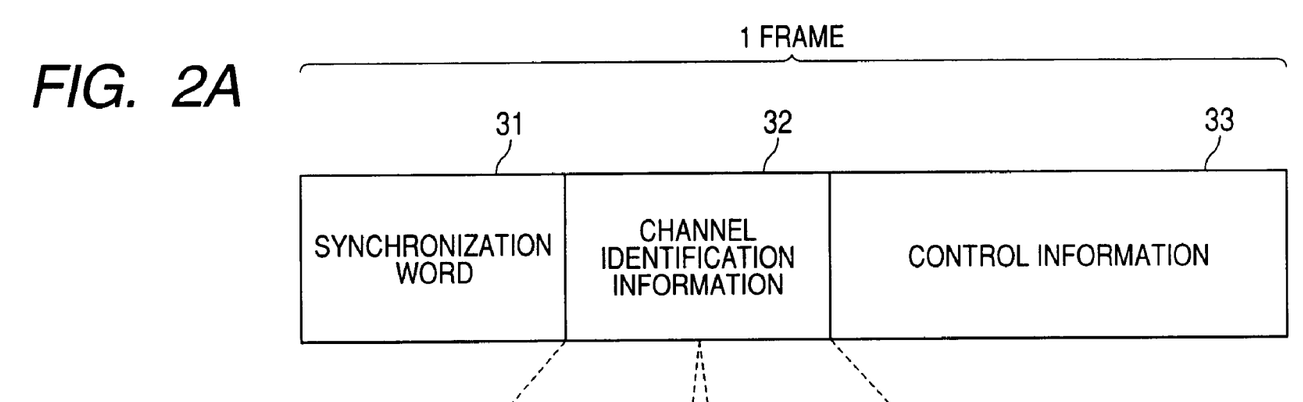
FIG. 2 is a diagram exemplifying a frame configuration of transport data that is generated by a frame data processing unit.

FIGS. 2(A) and (B) are diagrams exemplifying a frame configuration of transport data that is generated by the frame data processing unit 15. As shown in FIG. 2(A), transport data in one frame includes an area of a synchronization word 31, an area of channel identification information 32, and an area of control information 33.

The synchronization word 31 is used in synchronization for establishing synchronization in wireless communication between the line control apparatus 101 and respective mobile transmitting/receiving apparatuses 102. The synchronization word 31 has a predetermined code pattern, for example. The channel identification information 32 is used for identifying a wireless channel or a function channel at respective mobile transmitting/receiving apparatuses 102. The area for the channel identification information 32 includes the area for the wireless channel identification information 32A and the area for a function channel identification information 32B as shown in FIG. 2 (B). The control information 33 shows an informing message, a calling message or a message regarding another communication control.

When the control information 33 is an informing message, it includes information specific to the wireless communication system 100, information showing a configuration in a control channel used for controlling among wireless channels and the like. When the control information 33 is a calling message, it includes information showing a call channel allocated to the mobile transmitting/receiving apparatus 102 by the line control apparatus 101 when the mobile transmitting/receiving apparatus 102 receives a call from a transmitting end communication terminal. If the mobile transmitting/receiving apparatus 102 in a waiting state receives a calling message destined to the self machine (or a group the self machine belongs to) that is transmitted over the control channel, the mobile transmitting/receiving apparatus 102 is enabled to make a call with a transmitting end terminal by transferring to a call channel indicated by the calling message.

The frame data processing unit 15 enables an non-modulation carrier signal to be sent from the line control apparatus 101 corresponding to the area for control information 33. Here, when no messages are existent which must be notified to the mobile transmitting/receiving apparatus 102, the frame data processing unit 15 sets non-modulated setting data for causing a non-modulation carrier signal to be outputted from the line control apparatus 101 to the area for the control information 33. Here, the non-modulated setting data has no particular meaning for the mobile transmitting/receiving apparatus 102. That is to say, when the control information 33 is the non-modulated setting data, the area for the control information 33 means that it is in an unused state for the mobile transmitting/receiving apparatus 102. Thus, no controlling message to be used for controlling a line is transmitted.

Figure 2B:
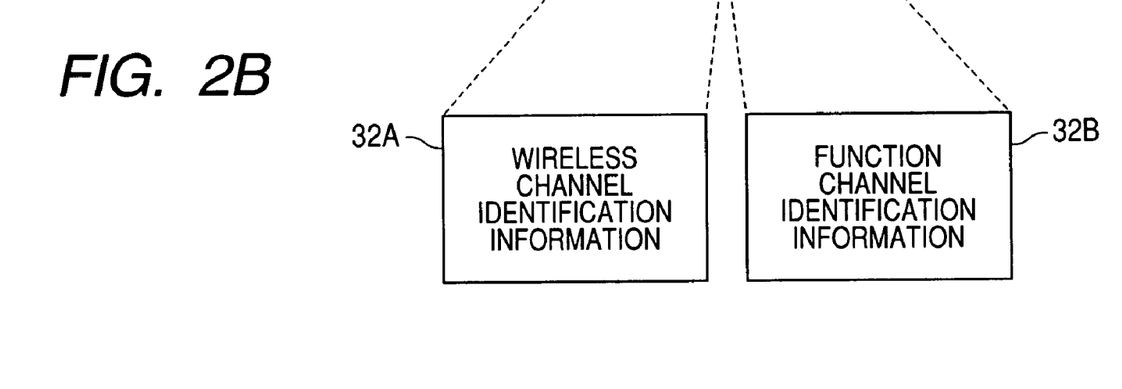

The wireless channel identification information 32A shown in FIG. 2(B) indicates whether the wireless channel transmitting the wireless channel identification information 32A is a control channel as a wireless channel for controlling or a call channel as a wireless channel for calling. The function channel identification information 32B indicates the kind of the control information 33 transmitted in the same frame. That is to say, the function channel identification information 32B indicates that information transmitted in the area for the control information 33 following to the area for the channel identification information 32 is any of an informing message, a call message and other message. Here, when non-modulated setting data is set in the area for the control information 33, the frame data processing unit 15 sets the non-modulated identification information that identifiably shows that the control information 33 is the non-modulated setting data in the area for the function channel identification information 32B.

The FSK modulator 16 is configured by a PLL (Phase Locked Loop) circuit including a voltage controlled oscillator and a reference oscillator or a DDS (Direct Digital Synthesizer), a quadrature modulation circuit or the like, for example, for generating a modulated wave signal that undergoes FSK (Frequency Shift Keying) modulation based on data transmitted from the frame data processing unit 15. When data transmitted from the frame data processing unit 15 is non-modulated setting data, the FSK modulator 16 generates a non-modulated wave such as a non-modulation carrier signal by stopping the FSK modulating operation, for example. The signal outputted from the FSK modulator 16 such as a modulated wave signal, a non-modulation carrier signal or the like generated by the FSK modulator 16 is sent to the transmitting circuit 17. The transmitting circuit 17 is configured by an up-converter, a power amplifier and the like, for example, for generating a RF signal in a band corresponding to each wireless channel based on a signal outputted from the FSK modulator 16 and supplying the signal to the transmitting antenna 12. For example, the transmitting circuit 17 causes a modulated wave signal that undergoes the four-level FSK modulation by the FSK modulator 16 or a non-modulation carrier signal to be outputted from the transmitting antenna 12 in a radio frequency wave band corresponding to a wireless channel.

The operation control part 18 is configured by a CPU (Central Processing Unit) and the like, for example, and is for controlling an operation of each part in the line control apparatus 101.

Each mobile transmitting/receiving apparatus 102 is configured by an antenna, a communication processing circuit, an audio processing circuit, an operation control circuit and the like, for performing various processes for providing wireless communication services such as individual calling, group calling, and a voice call to a user by transmitting/receiving a RF signal with the line control apparatus 101 placed at the wireless base station.

Figure 3:
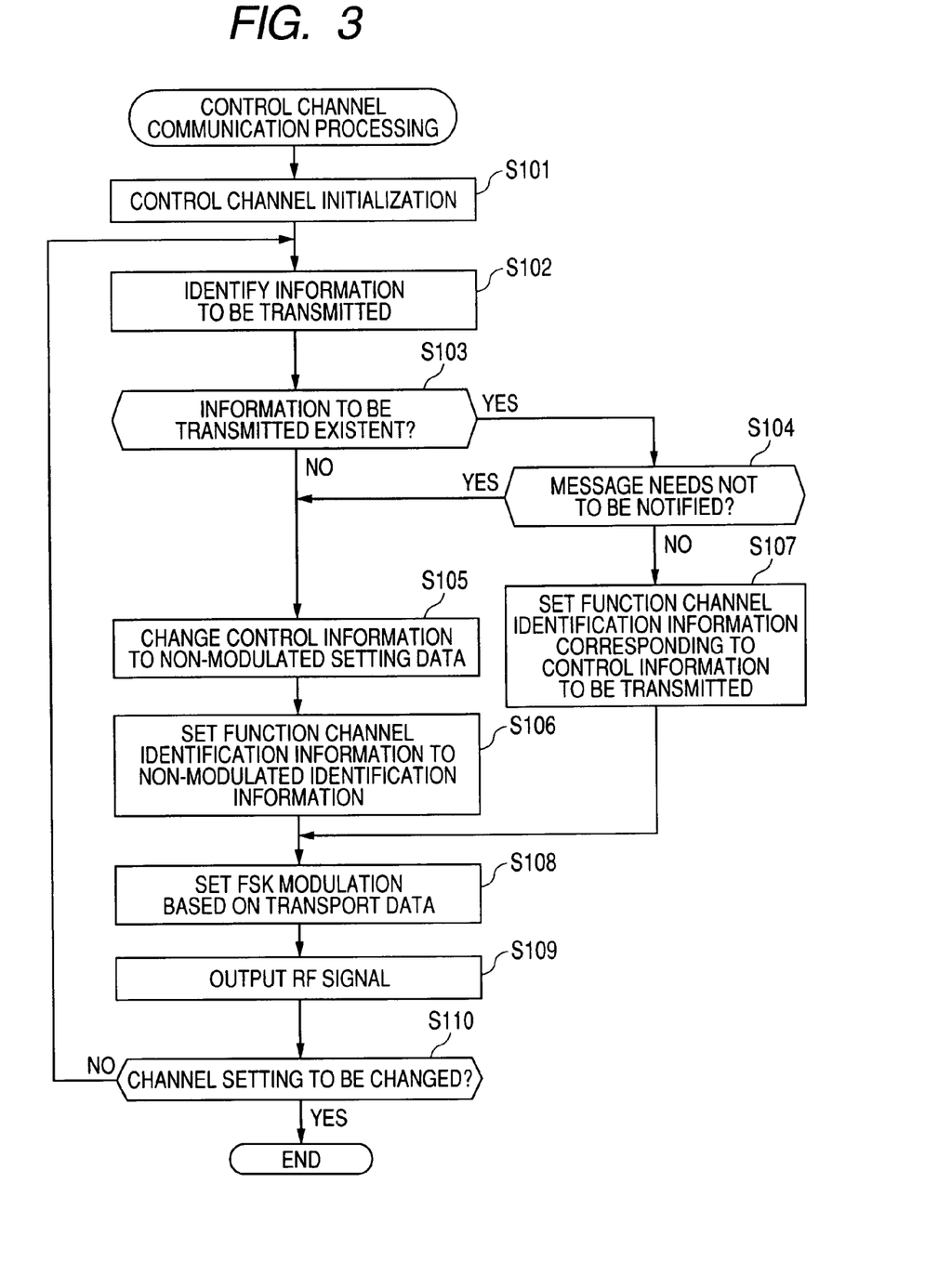
FIG. 3 is a flowchart showing an example of control channel communication processing.

Operation of the line control apparatus 101 in the wireless communication system 100 according to the embodiment of the present invention will be described below. FIG. 3 is a flowchart showing an example of control channel communication processing performed in the line control apparatus 101. The control channel communication processing shown in FIG. 3 is processing for transmitting various types of information regarding line controlling from the line control apparatus 101 to the mobile transmitting/receiving apparatus 102 when the mobile transmitting/receiving apparatus 102 performs wireless communication with the line control apparatus 101 over a control channel. The control channel communication processing is, for example, performed corresponding to a time when the mobile transmitting/receiving apparatus 102 starts processing for transmitting/receiving on a control channel.

When the control channel communication processing shown in FIG. 3 starts, the line control apparatus 101 first performs initial setting for using any of the wireless channels as a control channel such as updating of channel allocation, for example (step S101). Here, the line control apparatus 101 may dynamically select to use any of a plurality of wireless channels that is managed by itself as a control channel. In such a case, the line control apparatus 101 only need to enable reallocation of the control channel by updating channel allocation.

Following to that the line control apparatus 101 has completed initial setting for transmitting information over the control channel, the operation control part 18, for example, identifies information to be transmitted (message) that is to be incorporated in the area for the controlling information 33 at the side of the line control apparatus 101 among information including a frame structure shown in FIGS. 2(A) and (B) (step S102). In such a case, whether the information to be transmitted is existent or not is determined (step S103).

When it is determined that the information to be transmitted is existent at the step S103 (step S103; Yes), it is determined whether the information to be transmitted is a message that needs not to be notified to the mobile transmitting/receiving apparatus 102 or not (step S104). The determination as to whether the information to be transmitted is a message that needs to be notified to the mobile transmitting/receiving apparatus 102 or not may be any determination if only it is based on specification of the wireless communication system 100.

If it is determined that the information to be transmitted is not existent at the step S103 (step S103; No) or if it is determined that the message is not required to be notified at the step S104 (step S104; Yes), it means that no messages are existent which must be notified to the mobile transmitting/receiving apparatus 102. Thus, the frame data processing unit 15 generates transport data that is the area for the controlling information 33 changed into non-modulated setting data based on the determination that the area for the control information 33 is not used for transmitting a controlling message by the operation control part 18 (step S105). In such a case, information to be transmitted in the area for the function channel identification information 32B in the same frame is set for non-modulated identification information (step S106).

If it is determined that it is a message which must be notified to the mobile transmitting/receiving apparatus 102 at the step S104 (step S104; No), the frame data processing unit 15 sets the information to be transmitted that is identified at the step S102 in the area for the control information 33 by control of the operation control part 18, for example, and also sets information to be transmitted in the area for the function channel identification information 32B in the same frame in correspondence with the contents of the information to be transmitted that is set in the area for the control information 33 (step S107). That enables the frame including a call message to be identified by reading the area for the function channel identification information 32B at the side of the mobile transmitting/receiving apparatus 102 even when it transmits the call message without fixing a frame that is set in the area for the control information 33 as a message to be transmitted. That is to say, the mobile transmitting/receiving apparatus 102 can identify the frame including the call message without reading the area for the control information 33.

In such a manner, the transport data generated in the frame data processing unit 15 is transmitted to the FKS modulator 16. The FSK modulator 16 performs setting of the FSK modulation based on the transport data from the frame data processing unit 15 (step S108). If non-modulated setting data is included in the transport data here, the FSK modulator 16 generates a non-modulation carrier signal by stopping the FSK modulation, for example, during the period corresponding to the length of the non-modulated setting data. On the other hand, in a part of the transport data including a synchronization word or channel identification information or control information other than non-modulated setting data, the FSK modulator 16 performs FSK modulation corresponding to the transport data which is received from the frame data processing unit 15 and generates a four-level FSK signal in a radio frequency band corresponding to the control channel, for example. The FSK modulator 16 is not limited to the one that generates a four-level FSK signal in the radio frequency band and may be the one that generates a signal in a predetermined IF (Intermediate Frequency) band. In such a manner, the modulated wave signal of the radio frequency band (or intermediate frequency band) that is generated at the FSK modulator 16 is transmitted to the transmitting circuit 17.

The transmitting circuit 17 outputs a RF signal from the line control apparatus 101 to outside by supplying the signal transmitted from the FSK modulator 16 to the transmitting antenna 12 as it converts (up-conversion) the frequency of the signal transmitted from the FSK modulator 16 into a band of a control channel or amplifies the signal or the like (step S109). Then, the line control apparatus 101 determines whether the setting regarding the control channel to be changed or not (step S110). When a wireless channel being used as a control channel is used as a call channel or when a wireless channel being used as a call channel is reallocated to the control channel, for example, setting regarding the control channel needs to be changed.

If it is determined that setting regarding the control channel is to be changed at the step S110, the control channel communication process shown in FIG. 3 ends and a process that is prepared in advance for changing the setting regarding the control channel starts. In contrast, if it is determined that setting regarding the control channel is not to be changed at the step S110, a process for transmitting information at the next frame is continuously performed as it returns to the process at the step S102. The processes from the step S102 to the step S108 need not to be such that only any one of the processes is selected one by one to be performed. Rather, a plurality of the processes may be performed in parallel as each part of the line control apparatus 101 shares the processes.

Figure 4A:
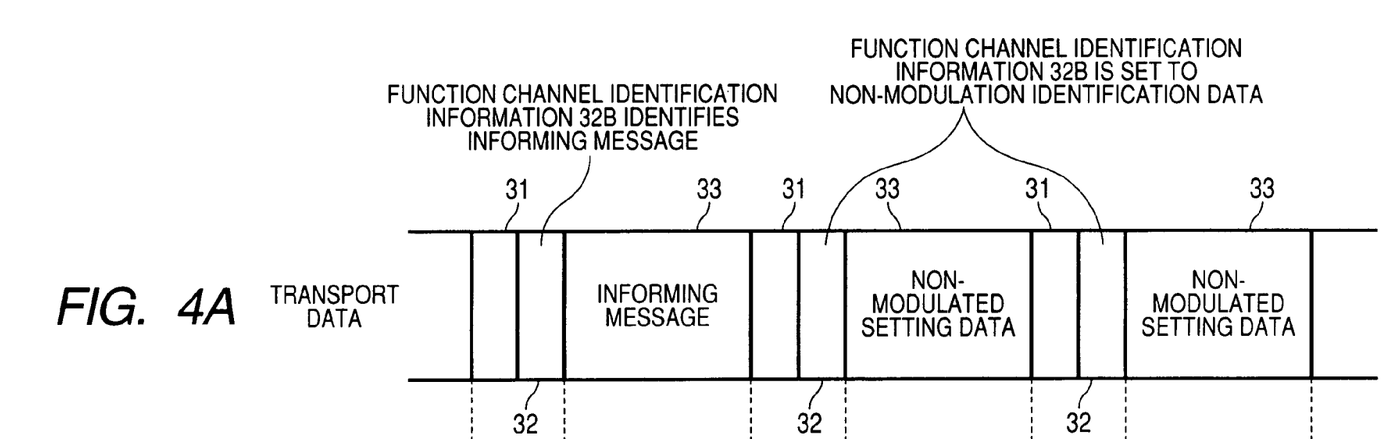
FIG. 4 is a diagram for illustrating an example of a specific operation in a line control apparatus.
Figure 4B:
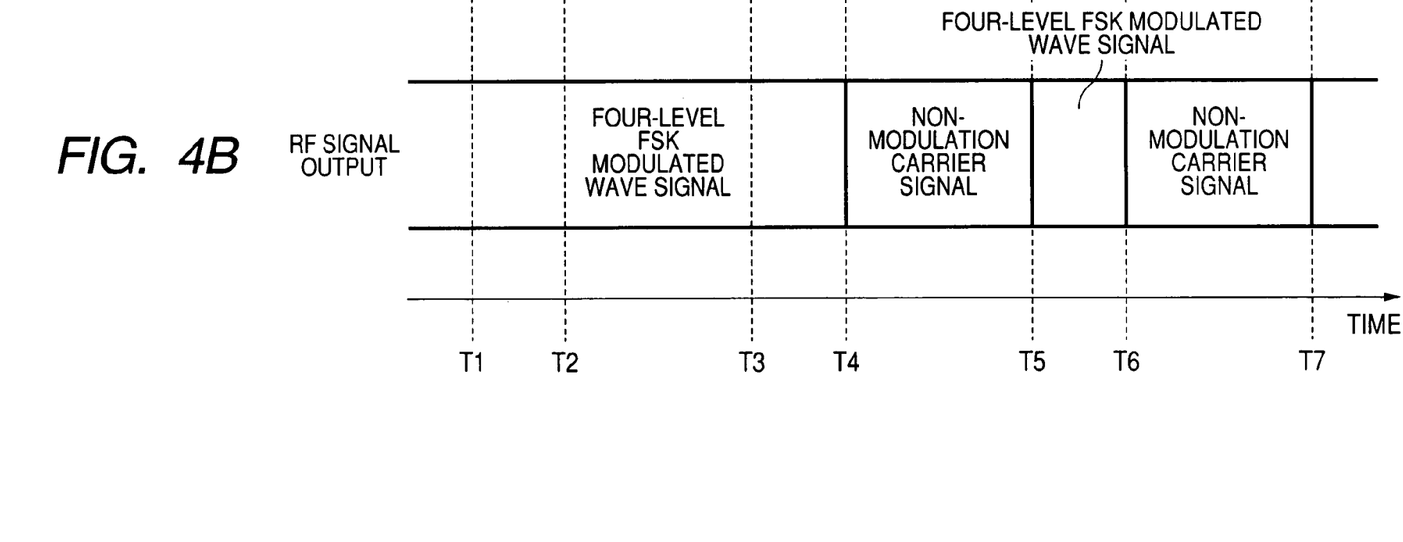

Now, an example of a specific operation in the line control apparatus 101 will be described. FIG. 4(A) is a timing chart showing a timing to transmit transport data with a frame structure that the line control apparatus 101 transmits to the mobile transmitting/receiving apparatus 102 over the control channel. FIG. 4(B) is a timing chart showing a modulation state for a RF signal which the line control apparatus 101 outputs in the frequency band of the control channel.

For example, as shown in FIG. 4(A), the line control apparatus 101 starts transmission of the transport data included in the first frame at the timing T1. In the first frame, an informing message that must be notified to the mobile transmitting/receiving apparatus 102 is assumed to be included in the area for the control information 33. In such a case, the frame data processing unit 15 in the line control apparatus 101 sets the function channel identification information 32B included in the area for the channel identification information 32 as the information indicating that the informing message is transmitted in the area for the control information 33. The transport data forming the first frame generated in this manner is transmitted from the frame data processing unit 15 to the FSK modulator 16.

The FSK modulator 16 outputs the modulated wave signal that undergoes the four-level FSK modulation to the transmitting circuit 17 by performing the FSK modulation corresponding to the transport data from the frame data processing unit 15. As an informing message different from non-modulated setting data in the area for the control information 33 is set here, the FSK modulator 16 keeps the FSK modulation even in the period after the timing T2 corresponding to the area for the control information 33. In response to the FSK modulation by the FSK modulator 16, the transmitting circuit 17 performs power amplification or the like on the modulated wave signal that undergoes the four-level FSK modulation to output the signal from the line control apparatus 101.

Next, the line control apparatus 101 starts to transmit information included in the second fame at the timing T3 as shown in FIG. 4(A). It is assumed that it is determined that no valid message to be transmitted such as an informing message or a call message is not existent in the process at the step S103 or in the process at the step S104 as shown in FIG. 3, for example, in the second frame (step S103; No, or the step S104; Yes). Then, in the line control apparatus 101, the non-modulated setting data is set in the area for the control information 33 in the second frame as the process at the step S105 is performed as shown in FIG. 3. The function channel identification information 32B included in the same frame is set to the non-modulation identification data as the process at the step S106 shown in FIG. 3 is performed here. The transport data included in the second frame generated in this manner is transmitted from the frame data processing unit 15 to the FSK modulator 16.

Figure 5A:
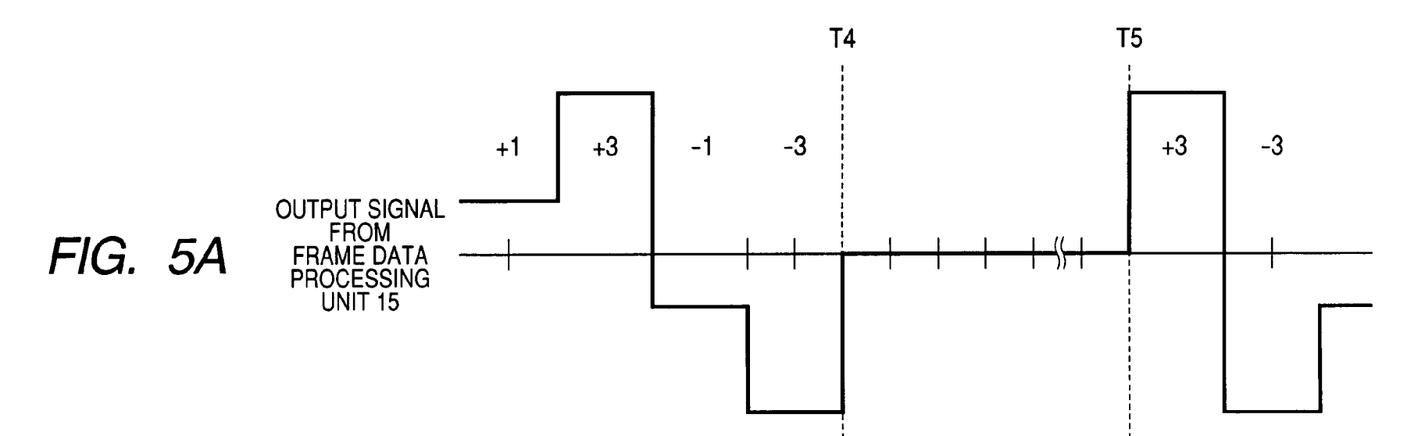
FIG. 5 is a diagram for illustrating an example of a specific operation in a line control apparatus.
Figure 5B:
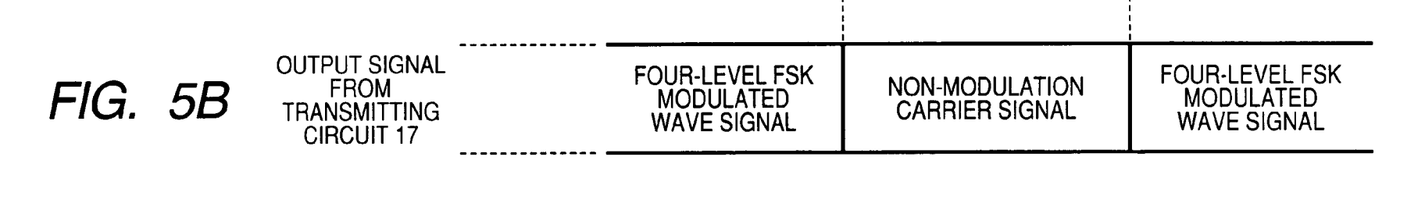

More specifically, as shown in FIG. 5(A), the frame data processing unit 15 outputs a rectangular wave signal formed by four signal levels as a four digits symbol data string, for example, to the FSK modulator 16 in correspondence with the area for the synchronization word 31 or the area for the channel identification information 32 included in the second frame during a period until the timing T4. The FSK modulator 16 outputs a modulated wave signal that undergoes the four-level FSK modulation to the transmitting circuit 17 by performing the FSK modulation corresponding to the transport data from the frame data processing unit 15 during a period until the timing T4. This enables the transmitting circuit 17 to output the modulated wave signal that undergoes the four-level FSK modulation from the line control apparatus 101 during a period until the timing T4 as shown in FIG. 5(B).

Thereafter during the period from the timing T4 to the timing T5, the area for the control information 33 among the transport data included in the second frame is transmitted from the frame data processing unit 15 to the FSK modulator 16. The transport data signal at a zero-level is outputted as non-modulated setting data as shown in FIG. 5(A), for example, from the frame data processing unit 15 here. In such a case, the FSK modulator 16 causes the transmitting circuit 17 to output a non-modulation carrier signal from the line control apparatus 101 as shown in FIG. 5(B), for example, by stopping the FSK modulation for example corresponding to that the transport data signal outputted from the frame data processing unit 15 is at the zero-level.

The mobile transmitting/receiving apparatus 102 can identify the period during which a non-modulation carrier signal is outputted from the line control apparatus 101 as the non-modulation identification data is set in the area for the function channel identification information 32B included in the second frame. During the period during which a non-modulation carrier signal is outputted form the line control apparatus 101, synchronization such as clock regeneration or the like cannot be performed by the mobile transmitting/receiving apparatus 102 here which is considered to cause a receiving operation unstable. The non-modulation identification data enables a non-modulated period to be identified at the mobile transmitting/receiving apparatus 102, thereby the receiving operation can be avoided to be in an unstable state. That is to say, when the non-modulation identification data set in the area for the function channel identification information 32B identifies that the area for the control information 33 is non-modulated, the mobile transmitting/receiving apparatus 102 can prevent any unstable operation in the area for the control information 33 which is considered as non-modulated by entering into a free-wheel state which is to make the clock regeneration timing to be kept such as by stopping the performance of synchronization during the period during which the area for the control information 33 is transmitted and causing a demodulation circuit to be operated at a free-running frequency (cause it to make free run).

When the timing T5 is reached, the line control apparatus 101 starts to transmit information included in the third frame as shown in FIG. 4(A). It is assumed to be determined that no messages to be transmitted in the process at the step S103 shown in FIG. 3 is existent following the second frame (step S103; No) or determined that it is a message which may not to be notified to the mobile transmitting/receiving apparatus 102 in the process at the step S104 (step S104; Yes). In such a case, in the line control apparatus 101, non-modulated setting data is set in the area for the control information 33 in the third frame similar to the manner when the second frame is transmitted. The function channel identification information 32B included in the same frame is set to the non-modulation identification data.

As shown in FIG. 5(A), a four-level symbol data string is transmitted from the frame data processing unit 15 during the period after the timing T5. In response to that, the FSK modulator 16 causes the transmitting circuit 17 to output the modulated wave signal that undergoes the four-level SFK modulation from the line control apparatus 101 as shown in FIG. 5(B) during the period after the timing T5.

During the period from the timing T6 to the timing T7, the area for the control information 33 among the transport data included in the third frame is transmitted from the frame data processing unit 15 to the FSK modulator 16. As the frame data processing unit 15 and the FSK modulator 16 operate in the same manner as that of the period from the timing T4 to the timing T5 here, a non-modulation carrier signal is outputted from the line control apparatus 101.

As mentioned above, according to the present invention, if no message to be transmitted is existent or if it is a message which may not to be notified to the mobile transmitting/receiving apparatus 102 when transport data with a frame structure as shown in FIG. 2 is transmitted over the control channel, a non-modulated wave is generated by the FSK modulator 16 in the area for the control information 33 and the non-modulation carrier signal is outputted from the line control apparatus 101. Here, the non-modulation carrier signal includes only frequency components corresponding to the center frequency of the control channel so that a spectrum of the transmitted signal only has a slight spread. Therefore, a RF signal which is significantly made into a narrower band than a non-modulated signal that undergoes the four-level FSK modulation is outputted so that influence to adjacent channels may be reduced.

In such a case, the level of interference to the adjacent channels is such that a time period during which a modulated wave signal that undergoes a usual four-level FSK modulation in correspondence with a controlling message other than the non-modulated setting data that is set in the area for the control information 33 or the transport data other than the area for the control information 33 is outputted and a time period during which a non-modulation carrier signal is outputted in correspondence with the non-modulated setting data are averaged. Then, if a call request message is generated with a low frequency for the line control apparatus 101 that is disposed in a wireless base station from the mobile transmitting/receiving apparatus 102, the number of messages to be notified to the mobile transmitting/receiving apparatus 102 in the area for the control information 33 at the side of the line control apparatus 101 lowers. That can lower the level of interference to the adjacent channels so as to reduce influence given to the adjacent channels by matching to narrowing the communication path.

When non-modulated setting data is set in the area for the control information 33, the function channel identification information 32B in the same frame is set to the non-modulation identification data. That enables the mobile transmitting/receiving apparatus 102 to perform controlling for preventing an unstable operation such as identifying a period during which a non-modulation carrier signal is transmitted and stopping the performance of synchronization during the identified period for example.

The present invention is not limited to the above-mentioned embodiments and may have various modifications and applications. That is to say, the above-mentioned embodiments have been described to output a non-modulation carrier signal in correspondence with the area for the control information 33 if no message which must be notified to the mobile transmitting/receiving apparatus 102 is existent, however, the present invention is not limited to the embodiments and may employ another method which can reduce influence to the adjacent channel. For example, in the area for the control information 33 included in a frame that is considered to include no message which must be notified to the mobile transmitting/receiving apparatus 102, a modulated wave signal can be outputted that undergoes two-level FSK modulation by using symbols with low degree of modulation, i.e., only two symbols with little deviation from the carrier frequency (center frequency of a control channel) (for example, −1 and +1) among four symbols (codes) used in the four-level FSK modulation (for example, −3, −1, +1, +3).

In this case, the frame data processing unit 15 continuously outputs a symbol string indicating "+1, −1" instead of usual transport data to the FSK modulator 16 in the area for the control information 33 in the frame that is considered to include no message which must be notified to the mobile transmitting/receiving apparatus 102 as in the period from the timing T4 to the timing T5 as shown in FIG. 5(A), for example. Then, the FSK modulator 16 causes the line control apparatus 101 to output by the transmitting circuit 17 a modulated wave signal that undergoes FSK modulation in correspondence with "+1" and "−1" during a period from the timing T4 to the timing T5, for example. That is to say, in the area for the control information 33 in the frame that is considered to include no message which must be notified to the mobile transmitting/receiving apparatus 102, a modulated wave signal that undergoes two-level FSK modulation is sent to the transmitting circuit 17 from the FSK modulator 16, while a modulated wave signal that alternatively undergoes the FSK modulation in correspondence with the two kinds of symbols "+1" and "−1" is outputted from the line control apparatus 101.

If a modulated wave signal that undergoes the two-level FSK modulation is outputted from the line control apparatus 101 in this manner, the mobile transmitting/receiving apparatus 102 can perform synchronization on clock regeneration or the like. Therefore, the non-modulation identification data set in the function channel identification information 32B in the above-mentioned embodiment may be omitted. Alternatively, even if a modulated wave signal that undergoes the two-level FSK modulation is outputted, it may be adapted to identify that no controlling message is transmitted in the area for the control information 33 at the side of the mobile transmitting/receiving apparatus 102 by setting the function channel identification information 32B to the non-modulation identification data in the same manner as in the above-mentioned embodiments. That is to say, as the data transmitted in the area for the control information 33 is the data that is not specifically counted for by the mobile transmitting/receiving apparatus 102 when no message which must be notified to the mobile transmitting/receiving apparatus 102, a period during which invalid control information is transmitted in the mobile transmitting/receiving apparatus 102 can be identified when the function channel identification information 32B is set to the non-modulation identification data.

The above-mentioned embodiment has been described to cause the line control apparatus 101 to output non-modulation carrier signal by the frame data processing unit 15 setting and outputting non-modulated setting data in the area for control information 33 to the FSK modulator 16, if no message which must be notified to the mobile transmitting/receiving apparatus 102 is existent. The present invention is not limited to the embodiment, however, and may have any configuration for stopping the FSK modulation by the FSK modulator 16. For example, if no message which must be notified to the mobile transmitting/receiving apparatus 102 is existent, the frame data processing unit 15 may send a non-modulated control signal to the FSK modulator for outputting a non-modulation carrier signal (or an intermediate frequency signal) from the FSK modulator 16 independently from transport data with a frame structure as shown in FIG. 2 at a timing when the area for the control information 33 is outputted to the FSK modulator 16.

When the mobile transmitting/receiving apparatus 102 receives non-modulation identification data as the function channel identification information 32B, it may perform any receiving operation such as detecting electric field strength of another control channel in a period during which the area for the control information 33 is transmitted. That is to say, no particular limitation needs to be provided for an operation of the mobile transmitting/receiving apparatus 102 in the area for the control information 33 included in the same frame as the non-modulation identification data is.

The above-mentioned embodiment has been descried such that the information transmitted from line control apparatus 101 to the mobile transmitting/receiving apparatus 102 over a control channel has a frame structure as shown in FIG. 2, however, the information may have a frame structure different from that. As a specific example, the information may have a frame structure including the area for the random access control information 35 as shown in FIG. 6.

If the wireless communication system 100 provides random access in the slotted ALOHA scheme, a call request message is immediately sent from the mobile transmitting/receiving apparatus 102 to the line control apparatus 101 over a control channel when a PTT (Push-To-Talk) switch (not shown) is turned on (for example, pressed) at the mobile transmitting/receiving apparatus 102. Then at the side of the line control apparatus 101, access control information indicating either permission or prohibition of random access needs to be returned by checking availability of the wireless channel and the like. Here, it is considered to set access control information in the area for the control information 33 among information with a frame structure as shown in FIG. 2. In the case of such setting, however, the number of times to set a controlling message other than non-modulated setting data in the area for the control information 33 is increased so as not to degrade line efficiency of the control channel. Accordingly, that shortens a time period during which a non-modulation carrier signal is outputted in correspondence with the non-modulated setting data, and increases the level of interference to adjacent channels.

Figure 6:
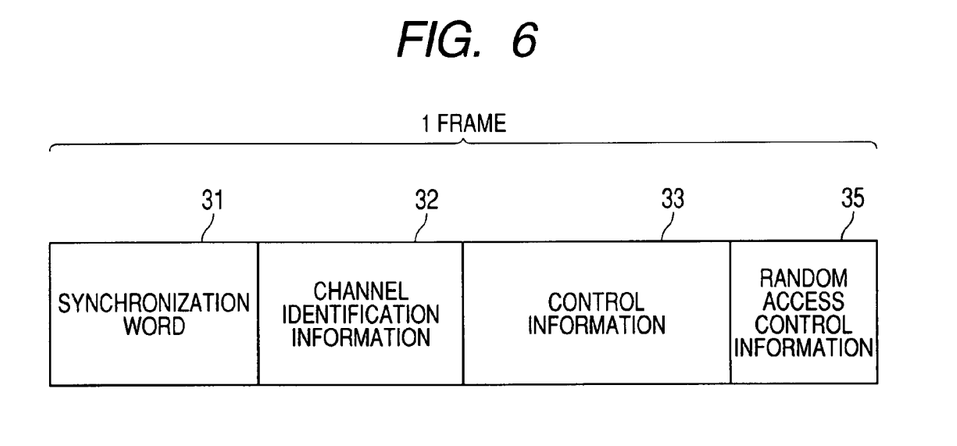
FIG. 6 is a diagram for illustrating a frame configuration of transport data in a modification example of the present invention.

Then, as shown in FIG. 6, the area for the random access control information 35 is separated from the area for the control information 33 and arranged in the place following to the area for the control information 33. The access control information indicating either permission or prohibition of random access only needs to be set in the area for the random access control information 35. That can prevent the line efficiency of the control channel from being degraded and also prevent the number of times for the non-modulated setting data to be set in the area for the control information 33 from decreasing.

The random access provided by the wireless communication system 100 is not limited to that in the Slotted ALOHA scheme and may be that in the ICMA-PE (Idle signal Casting Multiple Access-Pertial Echo) scheme that is also used in the ARIB-T61 scheme. In such a case, the line control apparatus 101 only needs to set busy/idle information indicating whether the wireless channel is busy or idle, or collision control information that uses a part of up-link information that is sent from each mobile transmitting/receiving apparatus 102 as a partial echo in the area for the random access control information 35.

If the frame structure is such that including the area for the random access control information 35 as shown in FIG. 6 and non-modulated setting data is set in the area for the control information 33, a non-modulation carrier signal (or an intermediate frequency signal and the like) is sent from the FSK modulator 16 to the transmitting circuit 17 in correspondence with the area for the control information 33, and then a modulated wave signal that undergoes the four-level FSK modulation is sent in correspondence with the area for the random access control information 35. That causes the transmitting circuit 17 to resume outputting of a non-modulated signal that undergoes the four-level FSK modulation in correspondence with the area for the random access control information 35 when a non-modulation carrier signal is caused to be outputted from the line control apparatus 101 in correspondence with the area for the control information 33.

As such, as the area for the random access control information 35 is separated from the area for the control information 33 and arranged in the place following to the area for the control information 33, the number of times for the non-modulated setting data is set in the area for the control information 33 increases and a time period during which a non-modulation carrier signal is outputted also increases so that the level of interference to adjacent channels can be lowered. In response to random access from the mobile transmitting/receiving apparatus 102, speedy allocation of a call channel and transfer from a control channel are available so that a call can start by establishing a communication link with a communication terminal of the other party in a short time.

The invention claimed is:

1. A wireless communication method by a wireless communication control apparatus for controlling wireless communication using a control channel and a plurality of call channels that can be allocated to any of a plurality of wireless communication apparatuses that are identified by information transmitted over the control channel, characterized by comprising:
  a transport data generating step of generating transport data with a frame structure having at least three areas of a synchronization word, channel identification information and control information; and
  a transmitting step of transmitting a modulated signal subjected to four-level Frequency Shift Keying (FSK) modulation corresponding to the transport data generated at said transport data generating step to at least one of said plurality of wireless communication apparatuses over the control channel;
  wherein said transmitting step includes a step of transmitting a modulated signal alternatively subjected to FSK modulation corresponding to two-level symbol whose deviation from the carrier frequency is little, among four-level symbols in correspondence with the area for the control information when the area for the control information included in the transport data generated at said transport data generating step is not used for transmitting the controlling message.

2. A wireless communication system in a trunk scheme including a plurality of wireless communication apparatuses (102) and a communication control apparatus (101) for controlling each of the plurality of wireless communication apparatuses (102) via a control channel, the plurality of wireless communication apparatuses sharing a predetermined number of wireless channels to transmit and receive wireless frequency signals with a base station, the communication control apparatus (101) comprising:
  a frame data processing unit (15) for generating a sequence of frames each of which comprises at least a control information area (33) comprising a control message including symbol data sequence and a function identification area (32B) comprising information indicative of type of data contained in the control information area (33), so as to transmit incoming data on frame-by-frame basis in response to the incoming data; and
  a transmitting and modulating circuit (16, 17) for modulating a carrier on the basis of data in the frame in response to the sequence of the frames so as to generate and transmit a modulated signal;
  wherein the transmitting and modulating circuit (16, 17) generates modulated signals carrying the control message including a symbol data sequence contained in the control information area in the frame, any of modulated signals being generated by modulating the carrier;
  wherein the frame data processing unit (15) forms a frame comprising a synchronization word area (31), a channel identification information area (32) consisting of a wireless channel identification information area (32A) and a function channel identified information area (32B), and a control information area (33), so as to contain predetermined non-modulated setting data in the control information area (33) and containing information indicative of the predetermined non-modulated setting data in the function channel identification information area (32B), when there are no messages to be notified to the wireless communication apparatus in the incoming data;
  wherein the transmitting and modulating circuit (16, 17) outputs non-modulated setting data during a period in which there is the non-modulated setting data contained in the control information area (33);
  wherein each of the plurality of wireless communication apparatuses (102) comprises:
  a clock regeneration means for regenerating a clock in synchronization with timing of the symbol data sequence demodulated from the received signal so as to establish the synchronization with the communication control apparatus (101);
  wherein the clock regeneration means reverts to a free-running free-wheel state when detecting information indicative of the predetermined non-modulated setting data contained in the function identification area (32B) in the frame of a signal received by the wireless communication apparatus, the free-wheel state stopping a synchronization process and operating at a free-running frequency, and the synchronization processing is performed by keeping the clock regeneration means in the free-running free-wheel state during a period in which a non-modulated carrier is received.

3. The wireless communication system according to claim 2, characterized in that,
  the predetermined non-modulated setting data comprises symbols having levels higher than that of the symbol data sequence.

4. The communication system according to claim 3, characterized in that,
  said frame data processing unit (15) includes determining means for determining that the area for the control information is not used for transmitting a controlling message when no messages which must be notified to said wireless communication apparatus exists.

5. A wireless communication control apparatus for controlling wireless communication using a control channel, and a plurality of communication channels that can be allocated to any of a plurality of wireless communication apparatuses that are identified by information transmitted over the control channel, characterized by comprising:
  transport data generating means for generating transport data with a frame structure having at least three areas of a synchronization word, channel identification information and control information; and modulating and transmitting means for generating and transmitting a modulated signal corresponding to the transport data generated by said transport data generating means to at least one of said plurality of wireless communication apparatuses over the control channel;

wherein said transmitting means transmits a non-modulated carrier signal in correspondence with the area for the control information included in the transport data generated by said transport data generating means when the area for control information included in the transport data generated at said transport data generating means is not used for transmitting the controlling message;

wherein said transport data generating means generates transport data by placing the area for the random access control information indicating either permission or prohibition of random access as transport data with said frame structure in the area subsequent to the area for the control information; and said transmitting means resumes transmission of a modulated signal in correspondence with the area for the random access control information when a non-modulated carrier signal is transmitted in correspondence with the area for the control information.

6. A wireless communication control apparatus for controlling wireless communication using a control channel and a plurality of communication channels that can be allocated to any of a plurality of wireless communication apparatuses that are identified by information transmitted over the control channel, characterized by comprising:

transport data generating means for generating transport data with a frame structure having at least three areas of a synchronization word, channel identification information and control information; and modulating and transmitting means for transmitting a modulated signal subjected to four-level FSK modulation corresponding to the transport data generated by said transport data generating means to at least one of said plurality of wireless communication apparatuses over the control channel;

wherein said transmitting means transmits a modulated signal alternatively subjected to FSK modulation corresponding to predetermined data of two-level symbol whose deviation from the carrier frequency is little, among four-level symbols in correspondence with the area for the control information when the area for the control information included in the transport data generated by said transport data generating means is not used for transmitting the controlling message.

* * * * *